UNITED STATES PATENT OFFICE 2,587,464

FIBER SPINNING COMPOSITION COMPRISING SOLUTIONS OF VINYLIDENE CHLORIDE POLYMERS IN TRIS(N,N-DIMETHYLAMINO)PHOSPHENE OXIDE

George E. Ham, Dayton, Ohio, assignor to Monsanto Chemical Company, St. Louis, Mo., a corporation of Delaware No Drawing. Application February 27, 1950, Serial No. 146,635

4 Claims. (Cl. 260—30.6)

This invention relates to a method of preparing fibers from the very difficulty soluble polyvinylidene chloride and copolymers of large proportions of vinylidene chloride and minor proportions of other polymerizable monomers. More specifically the invention relates to solutions of vinylidene chloride polymers.

It is well known that polyvinylidene chloride and copolymers of 85 per cent or more vinylidene chloride and up to 15 percent of other polymerizable monomers are insoluble in most common solvents. Although solutions of polyvinylidene chloride and the high vinylidene chloride copolymers are known, they are solutions only at high temperatures which are converted to reversible gels if the temperature is lowered. United States Patent No. 2,460,578, issued February 1, 1949, to Houtz, describes such solutions. It is stated in the specfication of this patent that a certain limited group of N,N-disubstituted amides are capable of dissolving polyvinylidene chloride at temperatures up to 190° C. but many of the claimed solutions revert to gels on cooling below 100° C.

The primary object of this invention is to provide a novel solution of polyvinylidene chloride. A further purpose of this invention is to provide a means of fabricating fibers from polyvinylidene chloride and copolymers of in excess of 85 percent of vinylidene chloride. A further purpose of this invention is to provide a new homogeneous solution of vinylidene chloride polymers from which fibers and films of the very insoluble polymers can be prepared.

In accordance with this invention it has been found that tris(N,N-dimethylamino)phosphine oxide is capable of dissolving polyvinylidene chloride and the difficulty soluble copolymers of vinylidene chloride. The invention is practicable with copolymers of 85 or more percent of vinylidene chloride and up to fifteen percent of other polymerizable monomers, for example styrene, vinyl chloride, methyl methacrylate, methyl acrylate, dimethyl fumarate, dimethyl maleate, butadiene, and homologues of these compounds.

The tris(dimethylamino)phosphine oxide may be prepared by reacting dimethylamine with phosphorus oxychloride and separating the reaction products by fractional distillation at reduced temperatures. The compound is collected at 68 to 70° C. at a pressure of about one millimeter.

In accordance with the practice of this invention the new solutions are prepared by dispersing the solid vinylidene chloride polymer, particularly finely divided polymers, in the tris(dimethylamino)phosphine oxide, and heating the mixture to a temperature in excess of 50° C. A clear, transparent solution results which maintains its liquid form indefinitely when cooled to room temperatures. Solutions can be prepared with very minute quantities of the polymer or it can be prepared in substantial concentrations. The more concentrated solutions, which are useful in the preparation of fibers and films by the various extrusion methods, are very viscous. The fiber and film fabrication may be conducted at room temperature for concentrations up to 30 percent. The fiber and film preparation from the very viscous concentrated solutions may under some circumstances be conducted at elevated temperatures for the purpose of achieving more favorable spinning solutions. The solution is also useful in dry spinning of fibers, which is preferably conducted at elevated temperatures for the purpose of vaporizing the solvent from the polymer solution. The optimum concentrations for fiber or film production operations are between 10 percent and 30 percent by weight. The solutions are also useful in coating objects with the vinylidene chloride polymer or copolymers by applying the solution to any object by dipping, spraying or brushing and thereafter evaporating the solvent by any conventional method, for example by heating in a suitable oven.

Further details of this invention are set forth with respect to the following examples.

*Example 1*

A mixture of one part by weight of polyvinylidene chloride and seven parts of tris(dimethylamino)phosphine oxide, was heated to 60° C. with vigorous stirring. A clear colorless solution was produced which did not gel when cooled to 20° C. The solution was spun into water to form continuous filaments.

*Example 2*

A mixture of one part of polyvinylidene chloride and seven parts of N,N-dimethylacetamide was heated to 100° C. with stirring before solution of the polymer took place. On cooling the solution was converted to an unspinnable gel.

*Example 3*

A mixture of one part of polyvinylidene chloride and seven parts of N,N-dimethylformamide was heated to 125° C. before complete solution occurred. On cooling to 100° C. a gel was formed.

*Example 4*

A 20% solution of polyvinylidene chloride in tris(dimethylamino)phosphine oxide was spun through a 10-hole .005" spinneret into water at 50° C. The fiber obtained was stretched in glycerine at 154° C.

I claim:

1. A homogeneous miscible mixture of a polymer of at least 85 percent vinylidene chloride and up to 15 percent of another polymerizable monomer, and tris(dimethylamino)phosphine oxide.

2. A homogeneous miscible mixture of polyvinylidene chloride and tris(dimethylamino)phosphine oxide.

3. A homogeneous miscible mixture of from 5 to 50 percent of a polymer of at least 85 percent vinylidene chloride and up to 15 percent of another polymerizable monomer and from 95 to 50 percent of tris(dimethylamino)phosphine oxide.

4. A homogeneous miscible mixture of from 5 to 50 percent of polyvinylidene chloride and from 95 to 50 percent of tris(dimethylamino)phosphine oxide.

GEORGE E. HAM.

REFERENCES CITED

The following references are of record in the file of this patent:

UNITED STATES PATENTS

| Number | Name | Date |
| --- | --- | --- |
| 2,404,722 | Houtz | July 23, 1946 |
| 2,460,578 | Houtz | Feb. 1, 1949 |
| 2,487,859 | Dickey | Nov. 15, 1949 |